United States Patent [19]

Froberg

[11] Patent Number: 4,796,276
[45] Date of Patent: Jan. 3, 1989

[54] MELTING FURNACE

[75] Inventor: Magnus L. Froberg, Granville, Ohio

[73] Assignee: Owens-Corning Fiberglas Corporation, Toledo, Ohio

[21] Appl. No.: 621,639

[22] Filed: Jun. 18, 1984

[51] Int. Cl.$^4$ .............................................. C03B 5/02
[52] U.S. Cl. ..................................................... 373/30
[58] Field of Search ....................... 373/30, 27, 137, 41

[56] References Cited

U.S. PATENT DOCUMENTS 4,366,571 12/1982 Palmquist .............................. 373/30

FOREIGN PATENT DOCUMENTS 1230177 12/1966 Fed. Rep. of Germany .

Primary Examiner—Envall, Jr. Roy N.
Attorney, Agent, or Firm—Patrick P. Pacella

[57] ABSTRACT

A method for melting thermosplastic material is disclosed. A protective liner for the interior of the furnace protects the refractory walls of the furnace from corrosion caused by the molten thermoplastic material. The improvement comprises confining a thermoplastic material between the liner and the refractory walls which is a viscous material such that its characteristics closely match those of a refractory composition.

8 Claims, 1 Drawing Sheet

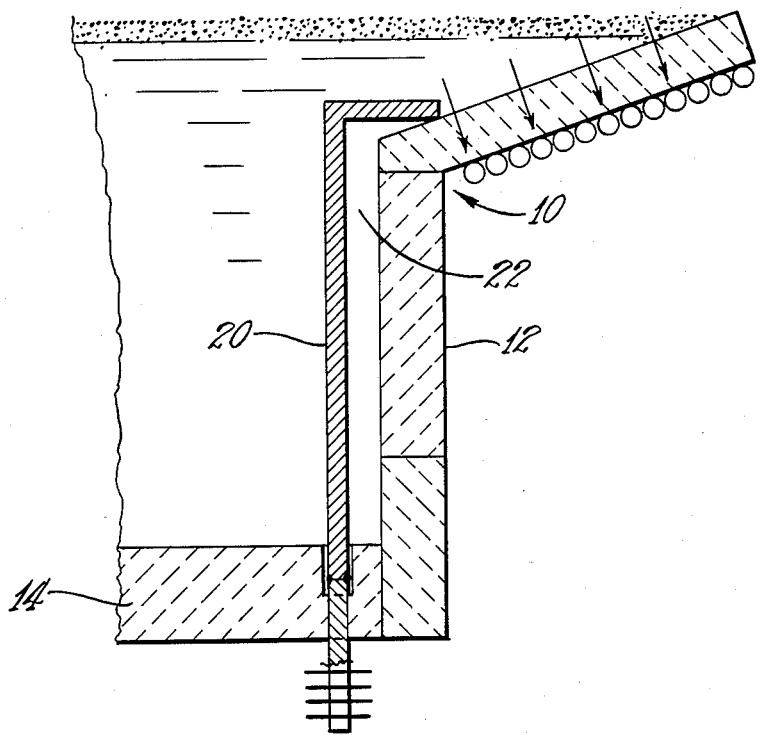

MELTING FURNACE

TECHNICAL FIELD

This invention relates to a furnace for melting thermo-plastic materials. More specifically, the furnace may be used for melting glass.

BACKGROUND ART

Refractory lined furnaces have been used for many years to melt glass. Many standard refractories, however, have a tendency to become slowly dissolved or corroded by the glass until the furnace begins to leak. As a result, providing a protective liner for the furnace has been proposed. In these lined furnaces, the liner generally is formed of a corrosion resistant material.

Molybdenum, platinum, platinum alloys, and, to some extent, steel alloys and iron have long been recognized as materials having a higher resistance to wear than conventional refractory and are considered useful in the construction of glass melting furnaces. Molybdenum, for example, has been used an an electrode material and as a lining where high glass velocities produce rather severe corrosion.

Joule-effect heating is a preferred method of melting glass in a furnace of the type described herein.

U.S. Pat. No. 4,366,571 issued to Ronald W. Palmquist on Dec. 28, 1982, discloses a typical electric furnace construction employing the use of a molybdenum liner. In the Palmquist patent, the space between the liner and the refractory wall is narrow, and thus convection currents caused by the heat in the furnace are eliminated or substantially reduced within such space thereby materially reducing convection corrosion of the refractory. The space acts as a trap for a mixture of corrosion products and thermoplastic material. Since corrosion products confined in the space are not continually swept away, corrosion of the refractory is inhibited.

Also, passive cooling is suggested to seal the space and prevent the circulation of the material retained therein. If desired, one or more cooling pipes may be provided to carry cooling gas near end portions or margins of liner. The resultant extra cooling usually assures a seal by virtue of frozen glass adjacent the ends of the liner space.

All of these suggestions are aimed at reducing the rate of corrosion in the space between the liner and the refractory wall. I have developed a method which uses a refractory-type material to benefit the process of producing molten material.

DISCLOSURE OF INVENTION

In my invention, a conventional glass melter is provided with a molybdenum or similar type liner. Because molybdenum has a relatively low oxidation temperature, but a high melting temperature, it is well suited as a linear material as long as it remains submerged within the melt. Such a liner is proposed where the space between the liner and inner wall of the melter refractory is filled with a viscous material such that its characteristics match closely those of the refractory material. This material is used in the cavity from the outset of operating the furnace.

Circulation of the glass is restricted along the bottom edge of the molybdenum liner by its interlocking with the bottom refractory, by an upper wall baffle and heat exchange means on the refractory wall. The liner is completely submerged thereby protecting it from oxidation, and the space between the liner and refractory reaches a steady state effectively neutralizing the erosion of the refractory normally associated with thermal circulation.

BRIEF DESCRIPTION OF DRAWING

The FIGURE is a schematic side view of a lined furnace.

BEST MODE OF CARRYING OUT INVENTION

Moly is recognized as a metal that has high temperature strength, is relatively inexpensive, and is chemically compatible with many glasses. A distinct disadvantage of this material is that it will oxidize above 550° C. In the past, it has been difficult to fabricate. Now that moly can be formed into flat or curved plate and pipe and welded into structures, it is a more attractive material. One of the most extraordinary advantages of moly, which melts at 2600° C., is its high temperature strength which allows it to be used up to about 2200° C. Note, for example, that platinum, which has heretofore been used almost exclusively in high temperature work, melts at 1730° C. and can be used up to only about 1600° C. Thus, moly is an extremely useful material since it is substantially less expensive than platinum and has a much higher melting point.

As shown in the FIGURE, a melting furnace 10, including upstanding refractory sidewall 12 and refractory bottom wall 14, is provided. Coaxially located within furnace 10 there is a liner 20 preferably formed of a highly corrosion resistant refractory metal.

Molybdenum appears to be a useful and preferred material for the liner 20 although tantalum, rhenium, niobium, and tungsten may also be suitable. Noble metals (e.g., platinum, rhodium, etc.) may also be suitable for the liner in some situations, especially where the glass is highly oxidized. The latter materials are relatively weak at high temperatures and may, therefore, require bracing or integral ribbing, not shown, to lend additional support to the liner 20. In such a situation where the glass is highly oxidized, cathodic or DC bias may be imposed on the liner in conjunction with an anionic sacrificial electrode. Such an arrangement would be less costly than using noble metals. It should also be mentioned that, for relatively low temperature melting of frits and the like below about 1100° C., steel and nickel alloys may be useful. Electrodes, for electrically firing the furnace 10, may be fabricated from the above materials but with the same preference for moly.

In a preferred embodiment, the liner 20 is fabricated from formed moly plates riveted together along lapped seams, no other reinforcement being deemed necessary. Also, plates of the above materials could be used as shields for the vessel if tightly spaced with each other. Walls 12 and the liner 20 are in close proximity, leaving a relatively narrow annular space 22 therebetween, which may extend from essentially intimate contact to some wider preferred spacing of about 1 inch or so.

My invention proposes to fill space 22 with a viscous material with characteristics that closely match those of the refractory employed in sidewalls 12. Glass compositions have very individualistic effects on refractories. The bulk of the glass melted in the world is of the soda-lime type; however even within the soda-lime glass family there are some quite individualistic behavioral patterns. The number of elements in the periodic table suitable as refractories for melting glass is rather limited. The materials which can be used are in most cases some combination, either by conventional or fusion methods of alumina, silica and zirconia. Some special glass. Clay, fused alumina, sintered AZS and dense sintered alumina are used in some other glasses (especially lead).

Typical refractories used in the glass industry:

TABLE I

| Type of Material | Typical Chemical Analysis | | | | | | | |
|---|---|---|---|---|---|---|---|---|
| | $ZrO_2$ | $Al_2O_3$ | $SiO_2$ | $Fe_2O_3$ | $TiO_2$ | CaO | MgO | $Cr_2O_3$ |
| Fused 33% $ZrO_2$ A.Z.S. | 33.5 | 49.6 | 15.2 | 0.1 | 0.1 | — | — | — |
| Fused 40% $ZrO_2$ A.Z.S. | 40.4 | 45.4 | 12.9 | 0.1 | 0.1 | — | — | — |
| Fused a-Alumina | — | 99.3 | 0.1 | 0.1 | — | 0.1 | — | — |
| Sintered 20% $ZrO_2$ A.Z.S. | 19.5 | 70.0 | 10.2 | — | — | — | — | — |
| Sintered Zircon | 65.5 | 0.5 | 33.5 | 0.1 | 0.3 | — | — | — |
| Standard Clay | — | 32.4 | 63.5 | 0.7 | 1.5 | 0.2 | 0.1 | — |
| Heavy Clay Flux | — | 45.4 | 50.4 | 0.9 | 1.8 | 0.1 | 0.1 | — |
| 60% $Al_2O_3$ Mullite (Sillimanite) | — | 60.5 | 37.1 | 0.6 | 0.9 | 0.1 | 0.2 | — |
| Fused -Alumina | — | 94.4 | 0.1 | 0.1 | — | 0.1 | 0.1 | — |
| Dense Zircon | 64.9 | 0.4 | 33.4 | — | 1.0 | — | — | — |
| Dense Chromic Oxide | — | — | — | — | 4.0 | — | — | 95.0 |
| Fused Chrome Alumina | — | 60.4 | 1.8 | 4.2 | — | — | 6.0 | 27.3 |
| Fused Chrome Spinel | — | 4.7 | 1.3 | 6.1 | — | — | 8.1 | 79.7 |
| Dense Sintered Alumina | — | 94.0 | 4.3 | — | 0.7 | — | — | — |
| Conventional Silica Brick | — | 0.5 | 95.8 | — | — | 2.9 | — | — |
| Fused Silica Brick | — | 0.4 | 98.9 | 0.4 | — | — | 0.1 | — |
| Semisilica Brick | — | 20.5 | 74.5 | 2.2 | 1.7 | 0.2 | 0.1 | — |
| Insulating Silica | — | 1.2 | 94.0 | 1.0 | — | 2.5 | 0.1 | — |
| Burned or Unburned High MgO Brick | — | 0.2 | 0.6 | 0.2 | — | 1.2 | 98 | — |
| Burned Spinel | — | 8.3 | — | — | — | — | 88.5 | — |
| Bonded Magnesite Magnesia-Chrome Brick (Unburned, Burned | — | 4.5–23.0 | 3–8.5 | 2.5–7.5 | — | 0.7–1.5 | 53–82 | 4.5–16.0 |
| Chrome Brick (Burned, Unburned) | — | 15–34 | 3–6 | 11–17 | — | — | 14–19 | 28–38 | glasses can tolerate chromium containing materials. Tin oxide, platinum and molybdenum are also compatible with glass contact, but because of their high cost are used only for rather special applications. Magnesium oxide is added to this list of materials which are useful but largely only for areas out of glass contact and then principally in heat regeneration systems.

All-electric melters (operating with a complete cover of unmelted batch over the liquid) do not have a metal line and wear more uniformly except around the electrode areas.

Large blocks are used throughout the glass contact areas to reduce the number of vulnerable joints where corrosion may be accelerated. The typical soda-lime glass practice is to use fused $ZrO_2$-$Al_2O_3$-$SiO_2$ refractories for most of this melter glass contact area. Practice in some low expansion borosilicate glasses is to use dense zircon. In some textile fiber glass applications, dense zircon and chrome containing refractories are used in veneer constructions with the more resistant (chrome-bearing) material being used in contact with The following table represents typical compositions of conventional glasses.

TABLE II

| Glass | $SiO_2$ | $Al_2O_3$ | $Fe_2O_3$ | CaO | MgO | BaO | $Na_2O$ | $K_2O$ | $SO_3$ | $F_2$ | ZnO | PbO | $B_2O_3$ | Se | CdO | CuO |
|---|---|---|---|---|---|---|---|---|---|---|---|---|---|---|---|---|
| Container Flint | 74.1 | 1.8 | nd | 8.8 | 1.4 | 0.2 | 13.0 | 0.4 | 0.1 | 0.3 | — | — | — | — | — | — |
| Container Amber | 70.6 | 4.2 | 0.4 | 9.8 | — | — | 13.3 | 1.8 | $^1$0.02 | — | — | — | — | — | — | — |
| Tableware Flint | 74.6 | 1.2 | 0.04 | 5.3 | 3.8 | — | 14.6 | 0.3 | 0.2 | — | — | — | — | — | — | — |
| Window | 72.0 | 1.3 | — | 8.2 | 3.5 | — | 14.3 | 0.3 | 0.3 | — | — | — | — | — | — | — |
| Plate | 71.6 | 1.0 | — | 9.8 | 4.3 | — | 13.3 | — | 0.2 | — | — | — | — | — | — | — |
| Opal Jar | 71.2 | 7.3 | — | 4.8 | — | — | 12.2 | 2.0 | — | 4.2 | — | — | — | — | — | — |
| Ruby Selenium | 67.2 | 1.8 | 0.03 | 1.9 | 0.4 | — | 14.6 | 1.2 | 0.1 | 0.4 | 11.2 | — | 0.7 | 0.3 | 0.4 | — |
| Borosilicate | 76.2 | 3.7 | — | 0.8 | — | — | 5.4 | 0.4 | — | — | — | — | 13.5 | — | — | — |
| Fiber Glass | 54.5 | 14.5 | 0.4 | 15.9 | 4.4 | — | 0.5 | — | — | 0.3 | — | — | 10.0 | — | — | — |
| Lead Tableware | 66.0 | 0.9 | — | 0.7 | — | 0.5 | 6.0 | 9.5 | — | — | — | 15.5 | 0.6 | — | — | — |
| Lead Technical | 56.3 | 1.3 | — | — | — | — | 4.7 | 7.2 | — | — | — | 29.5 | 0.6 | — | — | — |
| Lamp Bulb | 72.9 | 2.2 | — | 4.7 | 3.6 | — | 16.3 | 0.2 | 0.2 | — | — | — | 0.2 | — | — | — |

I have found my invention to be especially useful with E glass compositions. Basic E glass compositions are disclosed in U.S. Pat. No. 2,334,961 issued on Nov. 23, 1943. A typical E glass composition also is disclosed in column 5 of U.S. Pat. No. 3,840,379 issued on Oct. 8, 1974.

The viscous material confined between the liner and the refractory walls is supersaturated with refractory. Preferably, the viscous material is supersaturated with the same refractory composition used for the sidewalls. That is, the viscous material is made by dissolving as much refractory as you can in the glass at a temperature higher than the furnace will operate. The beginning glass is the same glass which will be made during the operation of the furnace. When the furnace is in operation, the refractory dissolved in the viscous glass will deposit on the surface of the sidewalls. In the Palmquist patent the opposite occurs, i.e., the refractory walls dissolve into the glass.

In most cases, the supersaturated glass will be denser than the initial glass but if it is not, a dense oxide like BaO needs to be added to insure that the viscous glass does not float out and contaminate the production product.

Any number of refractory glasses may be prepared including combinations from the refractories and glasses described in earlier pages of this specification.

I have found that a glass with this composition

| | |
|---|---|
| $SiO_2$ | 53% |
| $Al_2O_3$ | 36% |
| CaO | 6% |
| $B_2O_3$ | 2% |
| $R_2O$ | 0.3% |
| $TiO_2$ | 1.5% |
| $F_2$ | 0.2% |
| $Fe_2O_3$ | 0.5% | which is made by mixing 75% clay and 25% E-glass and melting the mixture will render a glass with a liquidus temperature of 2700° F. Therefore, if a furnace is operated so that the temperature between the molybdenum shell and the refractory wall is 2700° F. and the wall is made from a clay refractory, and a glass of this composition is placed between the two, crystals will grow in that area and the refractory will not wear.

INDUSTRIAL APPLICABILITY

It is presently contemplated that the furnace of the present invention will operate with maximum temperatures of 1700°-2000° C. The furnace described herein should have the same capacity as a conventional electrically fired unit two to four times larger. Conversely, a conventional electrically fired furnace the same size as that of the present invention should only produce about half the glass output thereof. For example, a 12 foot diameter conventional electric furnace could be replaced by a furnace of the type described herein that is only about 6 to 9 feet in diameter. Furthermore, the height of this furnace would be significantly less than that of a typical vertical melter. A shallow furnace is preferred since it is easier to build and requires less structural material for the lower head of glass confined therein.

In addition, because of the higher temperatures practically attainable, very hard glasses may be economically melted in large quantities. Further, entirely new and only theoretical compositions may be attempted.

The embodiment of the furnace described herein is a relatively small polyhedral melting unit having a diameter of approximately 4 feet and depth of about 3 feet. The furnace may be operated at and may be capable of melting a borosilicate glass at a rate of 1.5 sq. ft. per ton. The melting rates of conventional furnaces range from 6-12 sq. ft. per ton for gas fired regenerative types to about 3.0 sq. ft. per ton for a vertical electrically fired glass melting unit.

It is conceivable that this unit could economically melt soda lime glass at a melting rate of 0.75 sq. ft. per ton and possibly 0.50 sq. ft. per ton. With such results, it has been theorized that a relatively large capacity furnace of the type described herein would be useful in a so-called float glass operation thereby eliminating the necessity for the large conventional float furnace.

A fully lined furnace of the type described herein would require only about $2.25 \times 10^6$ BTU/ton, while a conventional gas regenerative float furnace may require about $5-7 \times 10^6$ BTU/ton.

The shape of the furnace and interior liner can be any one of many conceivable arrangements from circular to polyhedral and square or rectangular in plan view. Further, the side walls may be slanted to form a conical structure to control convection currents and/or to move the upper margins of the furnace away from the center while maintaining the hot central zone with a smaller concentrated body of glass. The features of the invention for protecting the liner and refractory vessel, however, remain essentially the same.

The arrangement of electrodes should be symmetrical. This is especially true in larger furnaces. The electrodes therein may be located every 30° or 60° with alternate sets exhibiting different firing patterns, e.g., cross firing, peripheral firing, etc. Other combinations and arrangements are possible up to as close as 15° staggered spacing, but the arrangements shown are presently preferred.

Symmetrical firing of electrodes positioned close to the batch blanket has the advantage of producing vertical and horizontal temperature stability which has been found to result in more efficient use of energy and produce better quality product. Normally, in a glass melting furnace, freshly heated glass tends to rise because of a reduction in its density with increasing temperature. Similarly, cooler glass being more dense tends to move downwardly. Convective rolls or rolling movement of the melted glass are thus produced and maintained within the melt since the differential in glass density produces a driving force creating such rolling movement. In the present invention, since the heat is placed high in the furnace just below fusion line, the heated glass tends to remain near the top of the furnace. Of course, some cooling will occur and glass will flow downwardly causing convection, but, since the glass is heated near the top of the furnace, its initial motion is restricted thereby reducing displacement of other glass nearby. The tendency of the newly heated glass to remain near the top of the furnace is reinforced because it is at a location where it is closest to equilibrium and is not being rapidly displaced and cooled.

Uniformity of horizontal temperature distribution results in suppression of one major convective roll from the hot side to the cold side of the furnace. By balancing heat input horizontally, there is less of a tendency for any portion of the furnace to produce excessive heating or cooling of glass which encourages convection.

I claim:

1. A method of protecting the refractory walls of a furnace for melting thermoplastic material from corrosion caused by the hot molten thermoplastic material within the furnace by providing a liner for the interior of the furnace and at the same time protecting the liner from oxidation including the steps of locating the liner within the furnace in close proximity with the refractory walls for providing a relatively narrow space between the liner and walls, confining a thermoplastic material supersaturated with refractory within the furnace between the liner and the walls, the confines of the narrow space inhibiting motion of the thermoplastic material, whereby corrosion of the walls is reduced and wherein the thermoplastic material confined between the liner and the refractory walls from the outset of operating the furnace is a viscous material such that its characteristics closely match those of a refractory composition, and totally immersing the liner beneath the thermoplastic material for shielding the same from ambient oxygen and thereby protecting the liner from oxidation while the liner protects the refractory walls, wherein the refractory dissolved in the confined thermoplastic material will deposit on the refractory walls adjacent the narrow space during operation of the furnace.

2. A method according to claim 1 wherein the thermoplastic material confined between the liner and the refractory walls is such that its characteristics closely match those of refractory walls adjacent the narrow space between the liner and the refractory walls.

3. A method according to claim 1 wherein the thermoplastic material produced in the furnace is glass and the thermoplastic material confined between the liner and the refractory walls is a mixture of glass and refractory.

4. A method according to claim 1 wherein the liner is made of molybdenum.

5. A method according to claim 1 wherein the thermoplastic material confined between the liner and the refractory walls is made by mixing, by weight, 75 percent clay and 25 percent E-glass and wherein the refractory walls are made of clay.

6. A method according to claim 5 wherein the material between the liner and the refractory walls has a composition comprising, by weight, of:

| | |
|---|---|
| $SiO_2$ | 53% |
| $Al_2O_3$ | 36% |
| $CaO$ | 6% |
| $B_2O_3$ | 2% |
| $R_2O$ | 0.3% |
| $TiO_2$ | 1.5% |
| $F_2$ | 0.2% |
| $Fe_2O_3$ | 0.5% | with a liquidus temperature of 2700° F.

7. A method according to claim 5 wherein the thermoplastic material produced in the furnace is E glass.

8. A method according to claim 6 wherein the liner is made of molybdenum and the furnace is operated so that the temperature between the molybdenum liner and the refractory walls is 2700° F.

* * * * *